United States Patent [19]

Wu et al.

[11] Patent Number: 5,654,254

[45] Date of Patent: Aug. 5, 1997

[54] PREPARATION OF HYDROCARBON ISOMERIZATION CATALYST

[75] Inventors: An-hsiang Wu; Ralph J. Melton, both of Bartlesville, Okla.

[73] Assignee: Phillips Petroleum Company, Bartlesville, Okla.

[21] Appl. No.: 493,974

[22] Filed: Jun. 23, 1995

[51] Int. Cl.$^6$ ............... B01J 23/42; B01J 31/00; B01J 27/13

[52] U.S. Cl. ............... 502/334; 502/152; 502/150; 502/230; 502/333; 502/335; 502/332; 502/325; 502/350; 502/351

[58] Field of Search ............... 502/152, 150, 502/230, 334, 333, 335, 332, 325, 350, 351

[56] References Cited

U.S. PATENT DOCUMENTS

| | | | |
|---|---|---|---|
| 2,900,425 | 8/1959 | Bloch et al. | 260/666 |
| 3,231,517 | 1/1966 | Bloch et al. | 252/442 |
| 3,248,320 | 4/1966 | White et al. | 208/136 |
| 3,903,195 | 9/1975 | Franck et al. | 260/683.68 |
| 3,923,915 | 12/1975 | Franck et al. | 260/666 P |
| 4,075,259 | 2/1978 | Pollitzer et al. | 260/683.68 |
| 4,149,993 | 4/1979 | Rao et al. | 252/442 |
| 4,283,585 | 8/1981 | Legendre et al. | 585/482 |
| 4,480,048 | 10/1984 | Bournonville et al. | 502/227 |
| 4,923,836 | 5/1990 | Kokayeff et al. | 502/74 |
| 5,004,859 | 4/1991 | Schmidt et al. | 585/741 |
| 5,474,964 | 12/1995 | Wu et al. | 502/326 |
| 5,536,692 | 7/1996 | Kubicek et al. | 502/230 |

*Primary Examiner*—Glenn A. Caldarola
*Assistant Examiner*—Thuan D. Dang
*Attorney, Agent, or Firm*—Charles W. Stewart

[57] ABSTRACT

A Group VIII metal- and chloride-containing composition (effective as an alkane/cycloalkane isomerization catalyst) is prepared by a method which comprises mixing at least one organoaluminum chloride (such as ethylaluminum dichloride) with a solid material containing at least one Group VIII metal (Pt and/or Pd and/or Ni) and alumina, heating the obtained mixture in an inert gas at about 630°–750° C., and then treating the mixture with a hydrogen chloride-containing gas at about 630°–700° C.

20 Claims, No Drawings

PREPARATION OF HYDROCARBON ISOMERIZATION CATALYST

BACKGROUND OF THE INVENTION

This invention relates to the preparation of Group VIII metal-containing compositions, which are effective as catalysts for isomerizing saturated $C_4$-$C_8$ hydrocarbons.

Supported Group VIII metal- and chloride-containing compositions for alkane isomerization reactions are well known, and are described in the patent literature, e.g., in U.S. Pat. Nos. 4,004,859 and 4,149,993. However, there are ever present incentives for the development of new effective methods of preparing them.

SUMMARY OF THE INVENTION

It is an object of this invention to provide a novel method for preparing supported, Group VIII metal- and chloride-containing compositions which are effective as catalysts for isomerizing alkanes and/or cycloalkanes. It is a specific object of this invention to prepare a catalyst composition which comprises platinum, chloride and alumina. It is another specific object of this invention to prepare a catalyst composition which comprises palladium, chloride and alma. It is still another specific object of this invention to prepare a catalyst composition comprising nickel, chloride and alumina. Other objects and advantages will become apparent from the detailed description and the appended claims.

In accordance with this invention, a method of preparing a solid Group VIII metal- and chlorine-containing composition comprises:

(1) impregnating a solid material comprising (i) at least one Group VIII metal selected from the group consisting of platinum, palladium and nickel and (ii) alumina as support with at least one organoaluminum chloride;

(2) heating the material obtained in step (1) in a substantially inert gas atmosphere at a temperature of about 630°–750° C. for a time period of at least about 10 minutes; and (3) treating the material obtained in step (2) with a hydrogen chloride-containing gas at a temperature of about 630°–750° C. for a time period of at least about 10 minutes.

Preferably, the solid material comprising components (i) and (ii) which is used in step (1) has been prepared by a method comprising:

(a) impregnating alumina with at least one compound of a Group VIII metal selected from the group consisting of platinum, palladium and nickel;

(b) calcining the impregnated alumina obtained in step (a) at a temperature of about 300°–650° C. for a time period of at least about 10 minutes; and (c) treating the calcined material obtained in step (b) with a reducing gas (preferably a free hydrogen-containing gas) at a temperature of about 200°–550° C. for a time period of at least about 10 minutes.

DETAILED DESCRIPTION OF THE INVENTION

Any suitable alumina material can be used in steps (a) of the preparation method of this invention. Suitable aluminas include (but are not limited to) hydrated aluminas (such as boehmite, pseudoboehmite, bayerite), alpha-alumina, beta-alumina, gamma-alumina, delta-alumina, eta-alumina and theta-alumina, preferably gamma-alumina. The alumina material generally has a surface area (determined by the BET method of Brunauer, Emmett and Teller employing $N_2$) of about 100–400 $m^2/g$, a pore volume (measured by nitrogen intrusion porosimetry) of about 0.2–1.0 $cm^3/g$, and a particle size of about 8–200 mesh. The alumina particles can be spherical, cylindrical, trilobal, or can have any other suitable shape. The presently preferred alumina particles are cylindrical extradates. It is within the scope of this invention to have small amounts of Ti or Zr or both metals (generally as $TiO_2$ and $ZrO_2$, respectively; a level of about 0.05–1 weight-% Ti or Zr or Ti+Zr) present in the alumina material used in step (a).

Any suitable platinum compound (preferably one which is water-soluble) can be used as the at least one Group VIII metal compound in step (a) of the preparation method of this invention. Suitable Pt compounds are well known and include (but are not limited to) platinum(II)chloride, platinum(IV)chloride, hexachloroplatinic(IV) acid, ammonium hexachloroplatinate(IV), tetrammineplatinum(II) chloride, tetrammineplatinum(II) carbonate, tetrammineplatinum(II) hydroxide, dichlorodiammineplatinum(II), tetrachlorodiammineplatinum(IV), platinum(II) nitrate, platinum(IV) nitrate, hexammineplatinum(II) nitrate, hexammineplatinum(IV) nitrate, diammineplatinum(IV) nitrite, diammineplatinum(II) oxalate, and many other complex (coordination) compounds of divalent and tetravalent platinum. Presently preferred is hexachloroplatinic acid, $H_2PtCl_6$.

Any suitable palladium compound (preferably water-soluble) can be used as the at least one Group VIII metal compound in step (a) of the preparation method of this invention. Suitable Pd compounds include (but are not limited to) palladium(II) chloride, palladium(II) nitrate, palladium(II) sulfate, palladium(IV) chloride, hexachloropalladic(IV) acid ($H_2PdCl_6$), ammonium hexachloropalladate(IV), tetramminepalladium(II) nitrate, tetramminepalladium(VII) chloride, tetramminepalladium(IV) nitrate, tetramminepalladium(IV) chloride, and other coordination compounds of divalent and tetravalent palladium.

Any suitable nickel compound (preferably water-soluble) can be used as the at least one Group VIII metal compound in step (a) of the preparation method of this invention. Suitable Ni compound include (but are not limited to) nickel(II) chloride, nickel(II) nitrate, nickel(II) sulfate, ammonium nickel(II) sulfate, nickel(II) acetate, nickel(II) oxalate, hexamminenickel(II) chloride, hexamminenickel(II) nitrate, hexamminenickel(II) sulfate, and other coordination compounds of divalent nickel. Presently preferred is nickel(II) nitrate, more preferably $Ni(NO_3)_2 \cdot 6H_2O$.

It is within the scope of this invention to have a dissolved titanium compound also present in step (a) of the preparation method of this invention, in particular when the alumina contains no Ti. Any soluble (preferably water soluble) titanium compound can be used in step (a), either before or simultaneously with or after the impregnation of alumina with at least one compound of at least one Group VIII metal (more preferably platinum). Suitable Ti compounds which can be employed in this embodiment include (but are not limited to) titanium halides such as $TiCl_4$, tetraalkyl titanates of the general formula $T(OR)_4$ wherein each R is an alkyl group (such as tetraethyl titanate, tetra-n-propyl titanate, tetraisopropyl titanate, tetrabutyl titanates) and water-soluble alkanolamine titanates (such as those described in U.S. Pat. Nos. 2,824,114; 2,935,522; 2,950,174; 3,028,297; 3,694,475; 3,892,791 and 4,621,148). These latter compounds are generally prepared by reacting one mole of tetralkyl titanate with 1–4 (preferably 2) moles of an alkanolamine selected from the group consisting of ethanolamine, diethanolamine, triethanolamine (preferred), monoisopropylamine, diisopropylamine and triisopropylamine. Each of the alkyl (R) groups (which may be the same as or different from one another) of the tetralkyl titanate, $Ti(OR)_4$, generally contains 2–4 carbon atoms, and preferably is the isopropyl group. A particular alkanolamine titanate which can be used in step (a) of the method of this invention is prepared by the reaction of 1 mole of tetraisopropyl titanate, $Ti(OC_3H_7)_4$, with 2 moles of triethanolamine, also referred to as tri(2-hydroxyethyl) amine, thus forming primarily diisopropyl-bis (triethanolamine) titanate. A solution containing 80 weight-% of diisopropyl-bis(triethanolamine) titanate and 20 weight-% of isopropanol is commercially available from DuPont de Nemours and Co., Wilmington, Del., under the product designation of "TYZOR" TE TITANATE (wherein "TYZOR" is a registered trademark of Du Pont).

The alumina material can be impregnated in step (a) with at least one dissolved Group VIII metal compound in any suitable manner, such as by incipient wetness impregnation or by spraying with an impregnating solution containing at least one dissolved Group VIII metal compound. Generally, the total concentration of the at least one Group VIII metal compound (i.e., at least one Pt compound or at least one Pd compound or at least one Ni compound or mixtures of compounds of different Group VIII metals) in the impregnating solution is in the range of about 0.01–2 mol/l. Generally, the solvent of the impregnating solution is an alcohol (such as ethanol) and/or water (the latter being presently preferred). If it is desired to also impregnate the alumina with at least one Ti compound (in particular, when the at least one Group VIII metal compound is at least one Pt compound), this can be done before or concurrently with or after the impregnation with the at least one Group VIII metal compound. The concentration of the Ti compound in the impregnating solution generally is about 0.01–2.0 mol/l. The solvent of this impregnating solution can be water and/or an alcohol (such as ethanol) or any other suitable liquid in which the particular Ti compound is soluble and stable. The weight ratio of the Group VIII metal-containing impregnating solution to alma in step (a) is such as to attain a weight percentage of about 0.1–5 (preferably about 0.2–2) weight-% Group VIII metal (on an elemental basis) in the finished composition (i.e., the material obtained in the last step of the preparation method of this invention). If impregnation with at least one Ti compound is also carried out, the weight ratio of the Ti-containing impregnating solution to the alumina material generally is such as to attain a weight percentage of about 0.05–1.0 (preferably about 0.1–0.3) weight-% Ti (on an elemental basis) in the finished composition.

In step (b), the Group VIII metal impregnated alumina material is heated (calcined) at a temperature of about 300°–650° C. (preferably 450°–550° C.) for a time period of about 0.5–20 hours (preferably about 2–4 hours). This calcining step can be done in an inert atmosphere (i.e., $N_2$, He, Ne, Ar) or in an $O_2$-containing atmosphere (e.g., air). Preferably, a drying step (generally at about 80°–150° C.) precedes heating step (b).

In step (c), the calcined material obtained in step (b) is treated with a reducing gas (preferably a gas stream) which generally comprises (preferably consists essentially of) free hydrogen ($H_2$), generally at a temperature of about 200°–550° C. (preferably about 350°–450° C.) for a time period of about 0.5–20 hours. Other (less preferred) reducing gases include (but are not limited to) carbon monoxide, $C_1$-$C_6$ alkanes and $C_2$-$C_6$ alkenes and $C_4$-$C_6$ alkadienes.

In step (1) of the preparation method of this invention, a Group VIII metal-containing alma, preferably one having been obtained by the above-described method comprising steps (a)–(c), is contacted with at least one suitable organoaluminum chloride. Examples of such organoaluminum chlorides include (but are not limited to) methylaluminum dichloride, methylaluminum sesquichloride, dimethylaluminum chloride, ethylaluminum dichloride, ethylaluminum sesquichloride, diethylaluminum chloride, propylaluminum dichloride, dipropylaluminum chloride, butylaluminum dichloride, dibutylaluminum chloride, and mixtures thereof. Presently preferred are ethylaluminum dichloride and dibutylaluminum chloride. These organoaluminum compounds are easily hydrolyzed and thus should be handled and applied in a dry, inert gas environment. Preferably, they are dissolved in a dry organic hydrocarbon solvent, such as a $C_6$-$C_{10}$ cycloalkane, benzene, toluene, ethylbenzene, xylene (s). The presently preferred solvent is cyclohexane.

Generally, the weight ratio of the organoaluminum chloride to the Group VIII metal-impregnated alumina in step (1) is in the range of about 0.05:1 to about 1:1, preferably about 0.1:1 to about 0.3:1. It is presently preferred to dissolve the organoaluminum chloride in an essentially water-free solvent and then contact the Group VIII metal-impregnated alumina with the solution (which generally contains about 5–50 weight-% of the organoaluminum chloride) at a temperature of about 10°–50° C. for a time period of about 0.5–5 hours (preferably about 1–2 hours). However, it is within the scope of this invention (yet less preferred) to vaporize the organoaluminum chloride and contact the thus-vaporized compound with the Group VIII metal-impregnated alumina at the above-recited weight ratio.

In step (2), the organoaluminum chloride-treated material obtained in the previous step is heated at a temperature of about 630°–750° C. (preferably about 650°–700° C.), generally for a period of time of about 0.5–20 hours (preferably about 0.5–2 hours). This heating step is carded out in an inert gas atmosphere (e.g., $N_2$, He, Ne, Ar). Preferably, step (2) is carried out in an upflow mode. It is presently preferred to carry out preliminary heating steps (more preferably in upflow inert gas streams) before step (2): increasing the temperature of the material obtained in step (1) from room temperature (about 10°–40° C.) to about 200°–275 ° C. within about 0.5–5 hours, heating at about 200°–275° C. for about 1–20 hours, and then increasing the temperature from about 200°–225° C. to about 630°–750° C. (more preferably about 650°–700° C.) within a time period of about 0.5–3 hours.

Chlorination step (3) is carded out by heating with an HCl-containing gas. The HCl treatment step is carded out at a temperature of about 630°–750° C. (more preferably about 650°–700° C.) for a period of time of about 0.2–20 hours (preferably about 0.5–2 hours). Pure HCl gas can be used, but generally HCl is diluted with an inert gas (e.g., $N_2$, He, Ne, Ar), preferably such that the HCl-containing gas mixture contains about 10–30 weight-% HCl. The HCl-treated material generally is cooled to room temperature (about 10°–40° C.), preferably in an inert gas atmosphere. Preferably, step (3) is carried out in an upflow mode, which generally results in a more uniform finished catalyst.

The finished catalyst composition obtained in step (3) generally contains about 0.1–5 (preferably about 0.2–2) weight-% of Group VIII metal (Pt and/or Pd and/or Ni) and about 2–7 (preferably about 4–5) weight-% Cl (chemically bound as chloride). The surface area, pore volume, shape and particle size of the finished catalyst composition are approximately the same as those of the alumina starting material (recited above).

The catalyst prepared by the method of this invention can be employed in the isomerization of saturated $C_4$-$C_8$ hydrocarbons (alkanes and/or cycloalkanes, preferably normal alkanes). Examples of suitable feed hydrocarbons include (but are not limited to) normal butane, normal pentane, normal hexane, normal heptane, normal octane, cyclohexane, methylcyclopentane, cycloheptane and methylcycloheptane (more preferably n-butane), generally in the presence of hydrogen. These so-called hydroisomerization processes are well known and have been described in the patent literature (e.g., in U.S. Pat. Nos. 4,149,993 and 5,004,859). Generally, hydrogen is mixed with the saturated feed hydrocarbon to form a feed mixture which is contacted with the isomerization catalyst of this invention contained in an isomerization zone. The concentration of the hydrogen in the feed mixture during this contacting step shall be such as to provide a hydrogen:hydrocarbon molar ratio of at least about 0.01:1, generally about 0.01:1 to about 5:1, preferably about 0.02:1 to about 2:1. The basic isomerization reaction conditions are well known and can be varied to achieve the desired conversion of the feed hydrocarbon to the desired isomer in a manner known in the art. Also, the recovery of the product isomer from the reaction mixture can be carried out by any suitable separation technique, such as fractional distillation. Isomerization of normal butane (n-butane) to isobutane is the presently preferred reaction carded out with the catalyst composition of this invention.

Generally, the saturated feed hydrocarbon and $H_2$ are contacted with the catalyst (generally present in a fixed bed) at a reaction temperature of at least about 200° F., preferably at a temperature of about 200°–500° F. In the preferred case of n-butane isomerization, the temperature is generally about 250°–400° F. Generally, the liquid hourly space velocity of the saturated hydrocarbon feed stream, i.e., cc of liquid feed hydrocarbon per cc of catalyst per hour, is about 0.1 to about 15. Generally, the reaction pressure is within the range of 200 psig to about 1500 psig in the isomerization zone. The gas hourly space velocity of the hydrogen feed stream is generally about 10–2,000 (preferably about 50–950) cc $H_2$ per cc catalyst per hour (so as to give the above-recited $H_2$:hydrocarbon ratio). In order to activate the catalyst and to retard its deaetivation during the isomerization reaction, about 0.001 to about 1 weight percent chloride is frequently added to the alkane feed, generally in the form of at least one chloroalkane (described above), preferably carbon tetrachloride, chloroform, ethyl chloride or isopropyl chloride.

When the catalyst, after it has been in use in the hydroisomerization process, has lost its activity to the extent that the desired alkane conversion can no longer be attained at the desired reaction temperature, the catalyst can be reactivated by turning off the flow of the saturated feed hydrocarbon while maintaining the flow of the $H_2$ stream through the isomerization catalyst, generally at about the same gas hourly space velocity of $H_2$ as in the isomerization reaction. The temperature in this reactivation step is generally about the same as in the isomerization reaction, but may be readjusted upward or downward to maximize the reactivation effect. In the preferred reactivation mode, a reducing gas stream consisting essentially of hydrogen is passed through the partially deactivated isomerization catalyst bed at a temperature of about 80°–350 ° F. (preferably about 250°–330° F.) and a GHSV (gas hourly space velocity) of about 10–2,000 cc $H_2$ per cc catalyst per hour (more preferably about 50–950 cc/cc/hour), for a time period of about 2 hours to about 10 days (more preferably about 5 hours to about 7 days). Thereafter, the reactivated catalyst is redeployed in the alkane hydroisomerization of saturated $C_4$-$C_8$ hydrocarbons, as described above.

The following examples are provided to further illustrate this invention and are not to be considered as unduly limiting the scope of this invention.

EXAMPLE I

This example illustrates the preparation of several chlorinated platinum-containing alumina compositions (useful as catalysts for alkane and/or cycloalkane isomerization).

Catalyst A (Invention) was prepared as follows. About 62.0 g dry gamma-alumina (provided by Criterion Catalyst Company, Houston, Tex.) was impregnated Coy incipient wetness at room temperature in an air atmosphere) with an aqueous platinum-containing solution containing 0.50 g $H_2PtCl_6$, 0.75 g HCl and 35.00 g $H_2O$. The Pt-impregnated material was air-dried (first under vacuum conditions at room temperature, than in an oven at about 125° C.), heated for 3 hours in air at 525° C., and then reduced by heating for 2 hours in flowing hydrogen gas at 420° C. 15.0 grams of the reduced material, which contained 0.31 weight-% Pt, was soaked for 16 hours in a solution of 1.95 g ethylaluminum dichloride (EADC) in about 4.5 g cyclohexane under an argon atmosphere at room temperature. The EADC-impregnated material was heated in a helium gas stream (flow rate of He: 300 cc/minute) in an upflow mode to about 650° C. at a rate of 10° C./minute, followed by heating for 1 hour at 650° C. in a HCl/He gas stream (also in an upflow mode; flow rate of HCl:300 cc/minute; flow rate of He:300 cc/minute), cooling in the HCl/He gas stream to 150° C., and cooling to room temperature.

Catalyst B (Invention) was prepared as follows. 15 g dry alumina was impregnated with a solution containing 0.125 g $H_2PtCl_6$, 0.12 g $TiCl_4$ and 6.67 g dry ethanol. The obtained impregnated alumina material was air-dried for 1 hour, heated in hydrogen gas for 1 hour at 125° C., calcined for 2 hours in air at 300° C. and reduced in a hydrogen gas for 2 hours at 400 ° C. The reduced material was impregnated with the EADC solution described for Catalyst A, and was then heated in He and in HCl/He gas streams as described for Catalyst A. Catalyst B contained 0.32 weight-% Pt and 0.20 weight-% Ti.

Catalyst C (Invention) was prepared essentially in the same manner as Catalyst B, except that 0.24 g $TiCl_4$ (instead of 0.12 g TlCl$_4$) was dissolved in the impregnating solution used for impregnating alumina. Catalyst C contained 0.32 weight-% Pt and 0.40 weight-% Ti.

Catalyst D (Control) was prepared substantially in accordance with the method for preparing Catalyst B except that the EADC-impregnated Pt/Ti/Al$_2$O$_3$ material was heated in helium gas at 590° C. (rather than 650° C.) before the HCl treatment.

Catalyst E (Control) was prepared substantially in accordance with the procedure for Catalyst C, except that the EADC-impregnated Pt/Ti/Al$_2$O$_3$ material was heated in helium gas at 550° C. (rather than 650° C.) before the HCl treatment.

Catalyst F (Control) was prepared substantially in accordance with the procedure for Catalyst B, except that the EADC-impregnated Pt/Ti/Al$_2$O$_3$ material was heated in helium gas at 450° C. (rather than 650° C.) for the HCl treatment.

EXAMPLE II

This example illustrates the performance of the catalyst compositions described in Example I in the isomerization of n-butane.

20 cc of each catalyst was placed in a stainless steel reactor tube having an inner diameter of 1 inch and a length of 28 inches. The steel reactor tube was heated to about 138° C. A stream of hydrogen gas was passed through the catalyst bed at a rate of 1.34 cubic feet per hour. The reactor pressure was about 500 psig. Liquid n-butane was introduced at a rate of 78.2 cc/hour (liquid hourly space velocity: 3.9 cc/cc catalyst/hour), while the flow of the hydrogen gas stream was maintained at 1.34 ft$^3$/hour so as to provide a molar ratio of H$_2$ to n-butane of about 50:1. After the hydrogen/n-butane mixture had passed through the catalyst bed at the above conditions for about 10 minutes, carbon tetrachloride was injected into this feed mixture at a rate of 16 microliters per hour for a time period of up to 22–24 hours. Thereafter, the CCl$_4$ feed rate was reduced to 6 microliters per hour, and the test was continued. The isomerization product was analyzed by means of a gas chromatograph. Pertinent catalyst preparation parameters and isomerization test results (obtained at comparable reaction times) are summarized in Table I.

TABLE I

| Catalyst | Wt-% Promoter(s) in Catalyst | First Chlorination Agent | First Chlorination Temp. (°C.) | Second Chlorination Agent | Second Chlorination Temp. (°C.) | n-Butane Isomerization Reaction Time (hr.) | n-Butane Isomerization % of Isobutane in Product |
|---|---|---|---|---|---|---|---|
| A (Invention) | 0.31% Pt | EADC | 650 | HCl | 650 | 40 | 11.2 |
| B (Invention) | 0.32% Pt + 0.20% Ti | EADC | 650 | HCl | 650 | 41 | 14.7 |
| C (Invention) | 0.32% Pt + 0.40% Ti | EADC | 650 | HCl | 650 | 41 | 11.1 |
| D (Control) | 0.32% Pt + 0.23% Ti | EADC | 590 | HCl | 650 | 52 | 1.4 |
| E (Control) | 0.33% Pt + 0.42% Ti | EADC | 550 | HCl | 650 | 26 | 1.4 |
| F (Control) | 0.33% Pt + 0.23% Ti | EADC | 450 | HCl | 650 | 44 | 7.6 |

Test data in Table I clearly show that the heat-treatment temperature after the impregnation of Pt/Ti-promoted alumina with ethylaluminum dichloride (EADC), i.e., the temperature of step (2) of the preparation method of this invention, is quite critical: heating at a temperature below 600° C. resulted in catalysts possessing inferior catalyst activity (compare control Catalysts D, E and F with invention Catalysts A, B and C).

EXAMPLE III

This example illustrates the copromoter effect of titanium. Various catalysts (labeled Catalyst G, H and I) were prepared substantially in accordance with Catalysts B and C, except that different amounts of Ti were incorporated into the catalysts. Pertinent test results, obtained in accordance with the method described in Example II, are summarized in Table II. Included in Table II are also test data for Catalysts A, B and C (described in Example I).

TABLE II

| Catalyst | Wt-% Promoter(s) in Catalyst | First Chlorination Agent | First Chlorination Temp. (°C.) | Second Chlorination Agent | Second Chlorination Temp. (°C.) | n-Butane Isomerization Reaction Time (hr.) | n-Butane Isomerization % of Isobutane in Product |
|---|---|---|---|---|---|---|---|
| A (Invention) | 0.31% Pt + 0% Ti | EADC | 650 | HCl | 650 | 46 | 11.1 |
| G (Invention) | 0.32% Pt + 0.10% Ti | EADC | 650 | HCl | 650 | 48 | 13.5 |
| B (Invention) | 0.32% Pt + 0.20% Ti | EADC | 650 | HCl | 650 | 47 | 14.5 |
| H (Invention) | 0.32% Pt + 0.31% Ti | EADC | 650 | HCl | 650 | 48 | 14.5 |
| C (Invention) | 0.32% Pt + 0.40% Ti | EADC | 650 | HCl | 650 | 47 | 11.4 |
| I (Invention) | 0.32% Pt + 0.61% Ti | EADC | 650 | HCl | 650 | 48 | 11.1 |

Test data in Table II show that a compromoter effect of Ti (in conjunction with Pt) was observed when the Ti content in the catalysts was about 0.1–0.3 weight-% Ti. When the mount of Ti was about 0.4 weight-% or higher, no advantage over the promoter effect of Pt alone was detected. Additional test data (not described in detail herein) indicate that the use of an alumina starting material (provided by United Catalysts, Inc., Louisville, Ky.) which was not impregnated with a Ti compound but contained a small amount of TiO$_2$ produced a catalyst which was more active than Catalysts A, C and I and almost as active as Catalyst G.

EXAMPLE III

This example illustrates the preparation of several chlorinated palladium-containing alumina compositions and the use of these materials as catalysts in alkane/cyclohexane isomerization reactions.

Catalyst J (Invention) was prepared as follows. 12.0 g palladium-on-alumina (1/16 inch extradates containing 0.5 weight-% Pd), provided by UCI (United Catalyst, Inc.; Louisville, Ky.) was impregnated (by incipient wetness) with a mixture of 4.3 g of a 45 weight-% EADC solution in n-pentane and 2.2 g cyclohexane, in an argon atmosphere. The thus-impregnated material was heated in Ar to 650° C., heated for 1 hour at 650° C. in an upflow stream of He/HCl (flow rate of He:300 cc/minute; flow rate of HCl:300 cc/minute), followed by cooling to 150° C. in this He/HCl gas stream.

Catalyst K (Invention) was prepared essentially in accordance with the preparation procedure for Catalyst L except that the 0.5% Pd/Al$_2$O$_3$ starting material had been provided by Catapal (now Ceralox Division of Vista Chemical Company, Tuscon, Ariz.) which had been calcined in air for 2 hours at 500° C. and had then been reduced with hydrogen gas for 2 hours at 380° C. before the chlorination treatment with EADC. The EADC-impregnated Pd/Al$_2$O$_3$ material was heated in an upflow helium stream (flow rate: 300 cc/minute) from room temperature to 650° C. at a rate of about 10° C./minute, followed by heating in He/HCl as described for Catalyst J.

Catalyst L (Invention) was prepared essentially in accordance with the procedure for Catalyst K, except that a solution of dibutylaluminum chloride (DBAC) was used in lieu of diethylaluminum chloride (EADC).

Catalyst M (Invention) was prepared essentially in accordance with the procedure for Catalyst K, except that the EADC-impregnated Pd/Al$_2$O$_3$ material was heated in the He gas stream from room temperature to 700° C. at a rate of 10° C./minute, followed by heating in He at 700° C. for 5 minutes, and heating in the He/HCl stream at 700° C. for 1 hour.

Catalyst N (Control) was prepared essentially in accordance with the procedure for Catalyst M, except that the EADC-impregnated Pd/Al$_2$O$_3$ material was heated in He to 600° C. and then in He/HCl at 600° C. for 1 hour.

Catalysts J–N were tested as catalysts in the isomerization of n-butane in accordance with the test procedure described in Example II. Pertinent test results are summarized in Table III.

Test data in Table III demonstrate that the temperature in both chlorination steps must be higher than 600° C. Additional tests (not described herein in detail) which were carded out for 16 hours at room temperature in an autoclave indicate that invention Catalysts J, K and L were also quite active as catalysts for isomerizing n-hexane to isohexanes and for isomerizing methylcyclopentane to cyclohexane (Catalyst M was not tested in an autoclave test).

EXAMPLE IV

This example illustrates the preparation of various chlorinated nickel-containing alumina compositions and the use of these materials as catalysts in a alkane isomerization reactions.

Catalyst O (Invention) was prepared as follows: 15.0 g alumina (provided by Criterion Catalyst Company, Houston, Tex.) was impregnated at room temperature with a solution of 1.5 g Ni(NO$_3$)$_2$.6H$_2$O in 8.5 g H$_2$O. The Ni-impregnated alumina was dried in air (for 1 hour at 125° C.) and calcined in air (for 2 hours at 500° C.), followed by reduction with flowing hydrogen gas (for 2 hours at 400° C.). The reduced Ni/Al$_2$O$_3$ material was impregnated for 16 hours at room temperature under an argon atmosphere with 6.5 g of a 30 weight-% solution of EADC in eyclohexane. The thus-impregnated material was heated in an upflow helium gas stream (flow rate of He:300 co/minute) from room temperature to 650° C. (at a rate of 10° C./minute), heated in the He gas stream for 5 minutes at 650° C., heated for 1 hour in a He/HCl upflow gas stream at 650° C., followed by cooling in this He/HCl gas stream to 150° C. Catalyst O contained 0.7 weight-% Ni and 3.0 weight-% Cl.

Catalyst P (Invention) was a regenerated Catalyst O, which had been used in a n-butane isomerization reaction (at 280° C., for about 120 hours) and had been regenerated by sequential heating in a mixture of air and steam (flow rate of each:500 cc/minute) for 1 hour at 500° C., in air (flow rate: 1 liter/minute) for 2 hours at 500° C., and in hydrogen gas (flow rate: 1 liter/minute) for 2 hours at 400° C.

Catalyst Q (Invention) was a regenerated Catalyst P, which had been used in a n-butane isomerization reaction (at 280° C., for about 70 hours) and had been regenerated (as described above for Catalyst P).

Catalysts O, P and Q were tested as catalysts in the isomerization of n-butane in accordance with the test procedure described in Example II. Pertinent test results are summarized Table IV.

TABLE III

| Catalyst | Wt-% Promoter(s) in Catalyst | First Chlorination Agent | First Chlorination Temp. (°C.) | Second Chlorination Agent | Second Chlorination Temp. (°C.) | n-Butane Isomerization Reaction Time (hr.) | n-Butane Isomerization % of Isobutane in Product |
|---|---|---|---|---|---|---|---|
| J (Invention) | 0.5% Pd | EADC | 650 | HCl | 650 | 40 | 13.3 |
| K (Invention) | 0.5% Pd | EADC | 650 | HCl | 650 | 40 | 14.1 |
| L (Invention) | 0.5% Pd | DBAC | 650 | HCl | 650 | 40 | 14.0 |
| M (Invention) | 0.5% Pd | EADC | 700 | HCl | 700 | 40 | 13.8 |
| N (Control) | 0.5% Pd | EADC | 600 | HCl | 600 | 40 | 1.6 |

TABLE IV

| Catalyst | Wt-% Promoter(s) in Catalyst | First Chlorination | | Second Chlorination | | n-Butane Isomerization | |
|---|---|---|---|---|---|---|---|
| | | Agent | Temp. (°C.) | Agent | Temp. (°C.) | Reaction Time (hr.) | % of Isobutane in Product |
| O (Invention) | 0.7% Ni | EADC | 650 | HCl | 650 | 29 | 19.5 |
| P (Invention) | 0.7% Ni | EADC | 650 | HCl | 650 | 28 | 19.0 |
| Q (Invention) | 0.7% Ni | EADC | 650 | HCl | 650 | 28 | 18.9 |

Test results in Table IV show that the chlorinated Ni/Cl/ $Al_2O_3$ catalysts which had been prepared in accordance with the method of this invention were quite active as n-butane isomerization catalysts (at least as active as the corresponding Pt- and Pd-containing catalysts described in Example I–III). These tests also demonstrate that these Ni-containing catalysts can be successfully regenerated (compare Catalysts P and Q with Catalyst O). Additional tests (not described in detail herein) revealed that the preparation of catalysts employing compounds of two other Group VIII metals (compounds of Co, Fe) resulted in much less active catalysts than the above-described chlorinated Ni, Pt and Pd catalysts.

Reasonable variations, modifications and adaptations for various conditions and reactants can be made within the scope of the disclosure and the appended claims without departing from the scope of this invention.

That which is claimed:

1. A method of preparing a solid Group VIII metal- and chlorine-containing composition which comprises:

(1) impregnating a solid material comprising (i) at least one Group VIII metal selected from the group consisting of platinum, palladium and nickel and (ii) alumina as the support with at least one organoaluminum chloride;

(2) heating the material obtained in step (1) in a substantially inert gas atmosphere at a temperature of 630°–750° C. for a time period of at least about 10 minutes; and (3) treating the material obtained in step (2) with a hydrogen chloride-containing gas at a temperature of 630°–750° C. for a time period of at least about 10 minutes.

2. A method in accordance with claim 1, wherein the weight ratio of said at least one organoaluminum chloride to said solid material in step (1) is about 0.05:1 to about 1:1, the time period of step (2) is about 0.5–20 hours, and the time period of step (3) is about 0.5–20 hours.

3. A method in accordance with claim 2, wherein said at least one organoaluminum chloride is selected from the group consisting of ethylaluminum dichloride and dibutylaluminum chloride.

4. A method in accordance with claim 2, wherein the temperature in step (2) is about 650°–700° C. and the temperature in step (3) is about 650°–700° C.

5. A method in accordance with claim 2, wherein said at least one Group VIII metal is platinum.

6. A method in accordance with claim 2, wherein said at least one Group VIII metal is palladium.

7. A method in accordance with claim 2, wherein said at least one Group VIII metal is nickel.

8. A method in accordance with claim 2, wherein step (2) is carried out in an inert gas stream in an upflow mode, and step (3) is carried out with a gas stream comprising HCl and an inert gas in an upflow mode.

9. A method in accordance with claim 8, wherein additional heating steps are carried out in inert gas streams in an upflow mode before step (2): heating the material obtained in step (1) from about 10°–40° C. to about 200°–250° C., heating said material obtained in step (1) at a temperature of about 200°–250° C. for a time period of about 1–20 hours, and increasing the temperature of said material obtained in step (1) from about 200°–250° C. to about 630°–750° F.

10. A method in accordance with claim 1, wherein said solid material comprising components (i) and (ii) used in step (1) has been prepared by a method comprising (a) impregnating an alumina material with at least one compound of a Group VIII metal selected from the group consisting of platinum, palladium and nickel;

(b) calcining the material obtained in step (a) at a temperature of about 300°–650° C. for a time period of at least about 10 minutes; and (c) treating the calcined material obtained in step (b) with a reducing gas at a temperature of about 200°–550° C. for a time period of at least about 10 minutes.

11. A method in accordance with claim 10, wherein said reducing gas employed in step (c) comprises free hydrogen.

12. A method in accordance with claim 11, wherein step (b) is carried out for a time period of about 0.5–20 hours, and step (c) is carried out for a time period of about 0.5–20 hours.

13. A method in accordance with claim 11, wherein step (a) is carried out with at least one dissolved platinum compound.

14. A method in accordance with claim 13, wherein said alumina material is also impregnated with at least one dissolved titanium compound.

15. A method in accordance with claim 11 wherein step (a) is carried out with at least one dissolved palladium compound.

16. A method in accordance with claim 11, wherein step (a) is carried out with at least one dissolved nickel compound.

17. A method in accordance with claim 1, wherein the material obtained in step (3) comprises about 0.1–5 weight-% of said at least one Group VIII metal and about 2–7 weight-% chlorine.

18. A method in accordance with claim 17, wherein said at least one Group VIII metal is platinum.

19. A method in accordance with claim 17, wherein said at least one Group VIII metal is palladium.

20. A method in accordance with claim 17, wherein said at least one Group VIII metal is nickel.

* * * * *